US009170629B2

(12) United States Patent
Noro

(10) Patent No.: US 9,170,629 B2
(45) Date of Patent: Oct. 27, 2015

(54) MEDIUM, CONTROL METHOD AND INFORMATION PROCESSING APPARATUS

(75) Inventor: Masaaki Noro, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 257 days.

(21) Appl. No.: 13/614,010

(22) Filed: Sep. 13, 2012

(65) Prior Publication Data

US 2013/0166900 A1 Jun. 27, 2013

(30) Foreign Application Priority Data

Dec. 21, 2011 (JP) ................................ 2011-280588

(51) Int. Cl.
*G06F 1/32* (2006.01)

(52) U.S. Cl.
CPC .............. *G06F 1/3206* (2013.01); *G06F 1/324* (2013.01); *G06F 1/3218* (2013.01); *Y02B 60/1217* (2013.01)

(58) Field of Classification Search
CPC ..... G06F 1/3203; G06F 1/3206; G06F 1/324; G06F 9/5038; G06F 2201/865
USPC .................. 713/100, 300, 320, 322, 323, 324
See application file for complete search history.

(56) References Cited

U.S. PATENT DOCUMENTS

2002/0042887 A1* 4/2002 Chauvel et al. ............... 713/300
2005/0076256 A1* 4/2005 Fleck et al. ................... 713/320
2007/0283176 A1* 12/2007 Tobias et al. .................. 713/322
2009/0313490 A1* 12/2009 Tani ............................. 713/320
2012/0324248 A1* 12/2012 Schluessler et al. .......... 713/300
2013/0111242 A1* 5/2013 Heller et al. .................. 713/323

FOREIGN PATENT DOCUMENTS

JP 8-76874 3/1996
JP 2000-183960 6/2000
JP 2005-285093 10/2005

OTHER PUBLICATIONS

Chinese Office Action issued Mar. 2, 2015 in corresponding Chinese Patent Application No. 201210428478.5.
Japanese Office Action issued Aug. 18, 2015 in corresponding Japanese Patent Application no. 2011-280588 Partial.

* cited by examiner

*Primary Examiner* — Kim Huynh
*Assistant Examiner* — Brandon Kinsey
(74) *Attorney, Agent, or Firm* — Staas & Halsey LLP

(57) ABSTRACT

A computer-readable storage medium stores a control program for an information processing apparatus that includes a process unit capable of executing an application program. The control program causes the information processing apparatus to execute a process. The process includes acquiring control information included in the application program, generating association information associating the application program with response performance information in accordance with the control information acquired in the acquiring, type information associating a combination of control information with a type of the application program, and response performance information associated with a type of the application program, and controlling operating frequency of the process unit in accordance with the response performance information corresponding to the application program when the application program described in the association information is operating.

8 Claims, 29 Drawing Sheets

| FORMULA (412) | ACTION (414) |
|---|---|
| REDUCTION OF TERMINAL SHIFTING TO SLEEP STATE, AND RECORDING AND (CHANGE IN AUDIO SETTING OR CHANGE IN ENTIRE TERMINAL SETUP) AND FULL INTERNET ACCESS | APPLICATION TYPE: VOIP |
| REDUCTION OF TERMINAL FROM SHIFTING TO SLEEP STATE AND (CHANGE IN AUDIO SETTING \| CHANGE IN ENTIRE TERMINAL SETUP) AND FULL INTERNET ACCESS | APPLICATION TYPE: STREAMING |
| REDUCE SHIFTING OF THE TERMINAL TO THE SLEEP STATE, AND RECORDING AND (CHANGE IN AUDIO SETTING OR CHANGE IN ENTIRE TERMINAL SETUP) | APPLICATION TYPE: IC RECORDER |

| FORMULA | ACTION |
| --- | --- |
| VOIP OR STREAMING OR IC RECORDER | REQUESTED PERFORMANCE (REAL-TIME RESPONSE WHEN LCD OFF): DESIRED |

| APPLICATION NAME (432) | ACCESS CONTROL INFORMATION (434) | | | | | CREATOR INFORMATION (436) | REDUCTION OF FILE INFORMATION TERMINAL FROM SHIFTING TO SLEEP STATE (438) |
|---|---|---|---|---|---|---|---|
| | REDUCTION OF TERMINAL SHIFTING TO SLEEP STATE | RECORDING | CHANGE IN AUDIO SETTING | FULL INTERNET ACCESS | ... | | |
| APPLICATION A | ○ | ○ | ○ | ○ | | | |
| APPLICATION B | ○ | ○ | | ○ | | | |
| APPLICATION C | ○ | | | ○ | | | |
| APPLICATION D | ○ | ○ | ○ | | | | |
| APPLICATION E | | | | ○ | | | |
| APPLICATION F | | ○ | ○ | ○ | | | |
| APPLICATION G | ○ | | | ○ | | | |

| APPLICATION NAME | REQUEST PERFORMANCE | |
|---|---|---|
| | REAL-TIME RESPONSE WHEN LCD IS OFF | ... |
| APPLICATION A | DESIRED | |
| APPLICATION B | DESIRED | |
| APPLICATION C | DESIRED | |
| APPLICATION D | DESIRED | |
| APPLICATION E | NOT DESIRED | |
| APPLICATION F | NOT DESIRED | |
| APPLICATION G | NOT DESIRED | |

| PROGRAM NAME | REQUEST PERFORMANCE | |
|---|---|---|
| | REAL-TIME RESPONSE WHEN LCD IS OFF | ··· |
| OS STANDARD SERVICE X | DESIRED | |
| ATTACHED APPLICATION 1 | DESIRED | |

| APPLICATION NAME | REQUEST PERFORMANCE | |
|---|---|---|
| | REAL-TIME RESPONSE WHEN LCD IS OFF | ... |
| APPLICATION A | ○ | |
| APPLICATION B | ○ | |
| APPLICATION C | ○ | |
| APPLICATION D | ○ | |
| OS STANDARD SERVICE X | ○ | |
| ATTACHED APPLICATION 1 | ○ | |

FIG. 12

<table>
<tr><th>FORMULA</th><th>ACTION</th></tr>
<tr><td>REDUCE SHIFTING OF THE TERMINAL TO THE SLEEP STATE AND RECORDING AND (CHANGE IN AUDIO SETTING OR CHANGE IN ENTIRE TERMINAL SETUP) AND FULL INTERNET ACCESS</td><td>APPLICATION TYPE: VOIP</td></tr>
<tr><td>REDUCE SHIFTING OF THE TERMINAL TO THE SLEEP STATE AND (CHANGE IN AUDIO SETTING | CHANGE IN ENTIRE TERMINAL SETUP) AND FULL INTERNET ACCESS</td><td>APPLICATION TYPE: STREAMING</td></tr>
<tr><td>REDUCE SHIFTING OF THE TERMINAL TO THE SLEEP STATE AND RECORDING AND (CHANGE IN AUDIO SETTING | CHANGE IN ENTIRE TERMINAL SETUP)</td><td>APPLICATION TYPE: IC RECORDER</td></tr>
</table>

MARK ACCESS CONTROL INFORMATION APPEARING IN DETERMINATION RULE

| | ACCESS CONTROL INFORMATION | | | | |
|---|---|---|---|---|---|
| | REDUCE SHIFTING OF THE TERMINAL TO THE SLEEP STATE | RECORDING | CHANGE IN AUDIO SETTING | ACQUIRE FULL INTERNET ACCESS | POSITION INFORMATION |
| APPEAR | ○ | ○ | ○ | ○ | × |

DELETE ACCESS CONTROL INFORMATION NOT APPEARING THE DETERMINATION RULE IS DELETED

| | ACCESS CONTROL INFORMATION | | | |
|---|---|---|---|---|
| | REDUCE SHIFTING OF THE TERMINAL TO THE SLEEP STATE | RECORDING | CHANGE IN AUDIO SETTING | POSITION INFORMATION |
| APPEAR | ○ | ○ | ○ | ○ |

| FORMULA | ACTION |
|---|---|
| REDUCTION OF TERMINAL SHIFTING TO SLEEP STATE, AND RECORDING AND (CHANGE IN AUDIO SETTING OR CHANGE IN ENTIRE TERMINAL SETUP) AND FULL INTERNET ACCESS | APPLICATION TYPE: VOIP |
| REDUCE SHIFTING OF THE TERMINAL TO THE SLEEP STATE AND (CHANGE IN AUDIO SETTING CHANGE IN ENTIRE TERMINAL SETUP) AND FULL INTERNET ACCESS AND (NOT RECORDING) | APPLICATION TYPE: STREAMING |
| REDUCTION OF TERMINAL SHIFTING TO SLEEP STATE, AND RECORDING AND (CHANGE IN AUDIO SETTING OR CHANGE IN ENTIRE TERMINAL SETUP) AND (NOT- FULL INTERNET ACCESS) | APPLICATION TYPE: IC RECORDER |

| FORMULA | ACTION |
|---|---|
| VoIP | REQUESTED PERFORMANCE (REAL-TIME RESPONSE WHEN LCD IS OFF):LARGE |
| IC RECORDER | REQUESTED PERFORMANCE (REAL-TIME RESPONSE WHEN LCD IS OFF):MIDDLE |
| STREAMING | REQUESTED PERFORMANCE (REAL-TIME RESPONSE WHEN LCD IS OFF):SMALL |

| APPLICATION NAME | REQUEST PERFORMANCE | |
|---|---|---|
| | REAL-TIME RESPONSE WHEN LCD IS OFF | ··· |
| APPLICATION A | LARGE | |
| APPLICATION B | LARGE | |
| APPLICATION C | SMALL | |
| APPLICATION D | MIDDLE | |
| APPLICATION E | NOT DESIRED | |
| APPLICATION F | NOT DESIRED | |
| APPLICATION G | NOT DESIRED | |

| APPLICATION NAME | REQUEST PERFORMANCE | |
|---|---|---|
| | REAL-TIME RESPONSE WHEN LCD IS OFF | ... |
| APPLICATION A | LARGE | |
| APPLICATION B | LARGE | |
| APPLICATION C | SMALL | |
| APPLICATION D | MIDDLE | |
| OS STANDARD SERVICE X | SMALL | |
| ATTACHED APPLICATION 1 | LARGE | |

MEDIUM, CONTROL METHOD AND INFORMATION PROCESSING APPARATUS

CROSS-REFERENCE TO RELATED APPLICATION

This application is based upon and claims the benefit of priority of the prior Japanese Patent Application No. 2011-280588, filed on Dec. 21, 2011, the entire contents of which is incorporated herein by reference.

FIELD

The embodiments discussed herein are related to a medium, a control method and an information processing apparatus.

BACKGROUND

In an information processing apparatus, typically, whether a user is manipulating the apparatus is determined and operating frequency of the CPU is changed automatically. If performance information to be used for the operation of the an application is already identified, operating frequency of the CPU for the operation of the application without any trouble is calculated and the calculated value is applied to the operating frequency of the CPU. With the thus calculated value, the operating frequency of the CPU does not have to be set too high. Therefore, it is possible to reduce power consumption of the information processing apparatus. In the OS often employed by portable terminals such as smartphones, operating frequency of the CPU is changed in accordance with the rate of utilization of the CPU. In this system, the maximum count ability that the application uses is provided to the CPU.

In smartphones, however, there are situations in which real-time performance is important even when the user is not manipulating the smartphone. For example, a user may connect a headset to the smartphone for the music reproduction, telephone call on the VoIP, reproduction of audio content by streaming and so forth, and places the main body of the smartphone in, for example, a bag. Therefore, it is desirable to detect that an operation for which a response is important is operating on the smartphone although the user is not manipulating the terminal, and to switch control or release of operating frequency of the CPU.

A user of a smartphone may install applications downloaded from an online market. Performance information of the application or type information of the application used to determine whether that application calls for real-time performance are not included in packages of these applications.

Therefore, it is desirable for the achievement of real-time performance even when a user is not manipulating the smartphone, to add, to all the applications, a field in which information for controlling or releasing operating frequency of the CPU is described or to describe type information of the application installed by the user in, for example, a configuration file.

However, since change in a format of an application package or a registering operation by a user is not easily performed, type information of the application has to be estimated only from information included in the current application package.

Japanese Laid-open Patent Publication No. 08-76874 and Japanese Laid-Open Patent Publication No. 2005-285093 are examples of the related art.

SUMMARY

According to an aspect of the invention, a computer-readable storage medium stores a control program for an information processing apparatus that includes a process unit capable of executing an application program. The control program causes the information processing apparatus to execute a process. The process includes acquiring control information included in the application program, generating association information associating the application program with response performance information in accordance with the control information acquired in the acquiring, type information associating a combination of control information with a type of the application program, and response performance information associated with a type of the application program, and controlling operating frequency of the process unit in accordance with the response performance information corresponding to the application program when the application program described in the association information is operating.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram which illustrates an application type determination rule;

FIG. 5 is a first diagram illustrating a requested performance determination rule;

FIG. 6 is a diagram which illustrates a package DB;

FIG. 7 is first diagram which illustrates a determination result table;

FIG. 8 is a diagram which illustrates a performance requested by application preregistration table;

FIG. 9 is a first diagram which illustrates a performance requested by application list;

FIG. 12 is a first diagram which illustrates rule retrieval;

FIG. 13 is a second diagram which illustrates rule retrieval;

FIG. 17 is a second diagram which illustrates a requested performance determination rule;

FIG. 18 is a second diagram which illustrates a determination result table;

FIG. 19 is a second diagram which illustrates a performance requested by application list;

DESCRIPTION OF EMBODIMENTS

Hereinafter, an information processing apparatus in the present embodiment will be described.

First Embodiment

Figure 1:
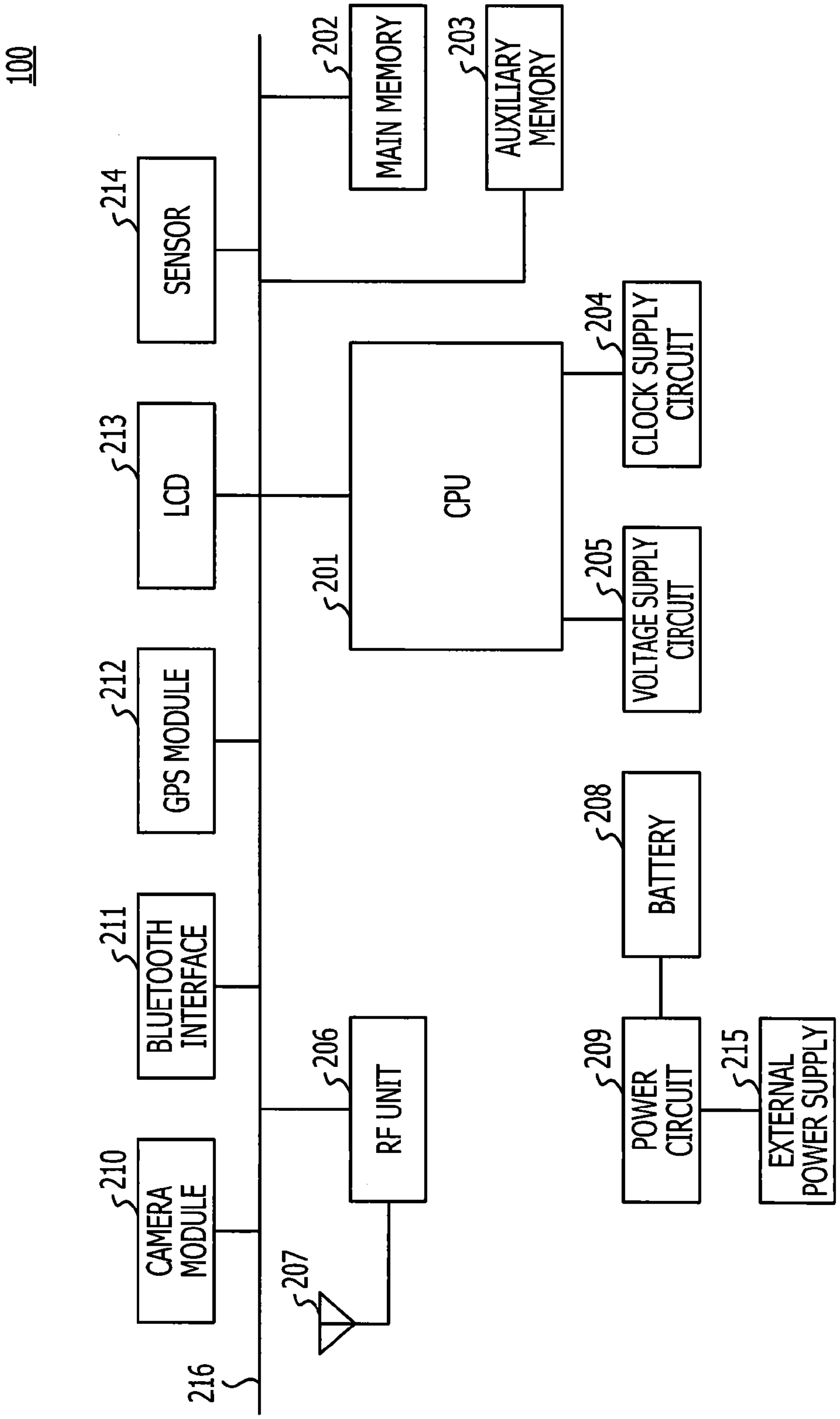
FIG. 1 is a diagram which illustrates a hardware configuration of information processing apparatus.

FIG. 1 is a diagram which illustrates a hardware configuration of an information processing apparatus in the present embodiment. An information processing apparatus 100 illustrated in FIG. 1 is, for example, a personal digital assistants, such as a smartphone and a tablet personal computer (PC). Hereinafter an application and an application package may be corresponding to an application program.

The information processing apparatus 100 includes, as a hardware module, a central process unit (CPU) 201, main memory 202, auxiliary memory 203, a clock supply circuit 204, a voltage supply circuit 205, a radio frequency (RF) unit 206, an antenna 207, and a battery 208. The information processing apparatus 100 includes, as a hardware module, a power circuit 209, a camera module 210, a Bluetooth interface 211, a GPS module 212, a liquid crystal display (LCD) 213, a sensor 214, and an external power supply 215. These hardware modules are connected to each other by, for example, a bath 216.

The CPU 201 controls the entire information processing apparatus 100. The CPU 201 operates with clock signals supplied from the clock supply circuit 204 and a voltage supplied from the voltage supply circuit 205. The CPU 201 reduces power consumption by completely stopping its operation whenever a software process is unnecessary, and by sleeping until an external interruption is made. The CPU 201 may include an arbitrary number of cores, such as a quad-core CPU.

The main memory 202 is, for example, random access memory (RAM). The main memory 202 is used as s work area of the CPU 201.

The auxiliary memory 203 is, for example, non-volatile memory, such as hard disk and flash memory. Various kinds of programs for the operation of the information processing apparatus 100 are stored in the auxiliary memory 203. The programs stored in the auxiliary memory 203 are loaded in the main memory 202, and executed by the CPU 201. In this manner, various programs described later are executed in the information processing apparatus 100.

The clock supply circuit 204 supplies clock signals of variable frequency to the CPU 201. The clock supply circuit 204 may be implemented by, for example, crystal oscillator which oscillates clock signals, and a real-time clock (RTC). The voltage supply circuit 205 supplies a variable voltage to the CPU 201 by the power supplied from the power circuit 209. The voltage supply circuit 205 is implemented by, for example, a voltage detector and a voltage regulator.

The RF unit 206 has a function as a transmitter which transmits high frequency signals to other wireless communication devices from the antenna 207 under the control of the CPU 201. The RF unit 206 has a function as a receiver which converts the high frequency signal received by the antenna 207 into baseband signals and outputs to the CPU 201.

The battery 208 supplies power to the power circuit 209. The battery 208 may be implemented by, for example, battery, such as lithium ion battery, and integrated circuit (IC) for battery protection. The power circuit 209 supplies power supplied from the battery 208 to each hardware module of the information processing apparatus 100 via an unillustrated power source wire. If the external power supply is connected to the external power supply 215, the power circuit 209 may supply power supplied from the external power supply 215 to each hardware module of the information processing apparatus 100. The power circuit 209 may be implemented by, for example, a switching regulator and a voltage regulator.

The camera module 210 captures an object under the control of the CPU 201, and acquires captured image data. The Bluetooth interface 211 is a communication interface for carrying out Bluetooth (registered trademark) wireless communication with other communication devices under the control of the CPU 201. The information processing apparatus 100 includes a wireless communication interface, such as a wireless local area network (LAN) in addition to the Bluetooth interface 211.

The GPS module 212 acquires position information which represents a current position of the information processing apparatus 100 on the earth by receiving a radio wave generated by a satellite under the control of the CPU 201.

The LCD 213 is an image display device which displays an image to a user under the control of the CPU 201. The LCD 213 may be a touch panel which has a position input function, such as a touchpad.

The sensor 214 acquires information which represents statuses of constituents of the information processing apparatus 100 under the control of the CPU 201. Examples of the sensor 214 include an acceleration sensor, a gyro sensor, a luminance sensor, a magnetic field sensor, a tilt sensor, a pressure sensor, a proximity sensor, and a temperature sensor.

Figure 2:
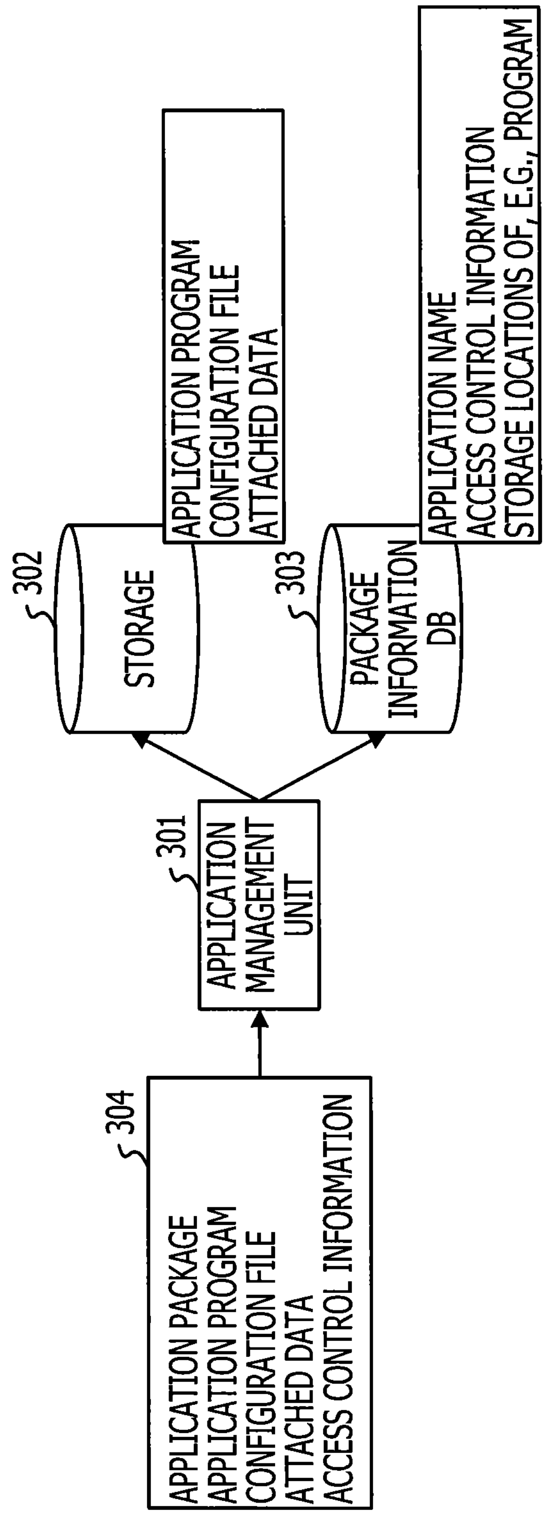
FIG. 2 is a diagram which illustrates a configuration of an application package, and a location at which the application package is installed.

FIG. 2 is a diagram which illustrates a configuration of the application package 304 and a location at which the application package is installed in the present embodiment.

In the field of smartphones, a user downloads and uses a charged or uncharged application package provided by application providers worldwide. Download is carried out through a network to the terminal of the user. Therefore, access control information is attached to the application package from the viewpoint of security: the access control information is related to, for example, whether data communication is carried out, whether wireless LAN is used, whether highly precise positioning using the GPS is carried out, and whether user's personal information is to be read. The user refers to that access control information and determines whether user actually uses the application. In addition, the system reduces the application from carrying out operations which are not in the access control information attached to the application package when the application is executed. Therefore, in smartphones, the access control information in the package is stored inside the terminal at the time of installation of an application.

The application package 304 includes applications, configuration files, attached data, and access control information. The application management unit 301 manages various applications. The application management unit 301 stores applications, configuration files, and attached data in the storage 302. The application management unit 301 stores, in a package information DB 303, application names, access control information, and information about storage locations, such as storage locations of programs.

Figure 3:
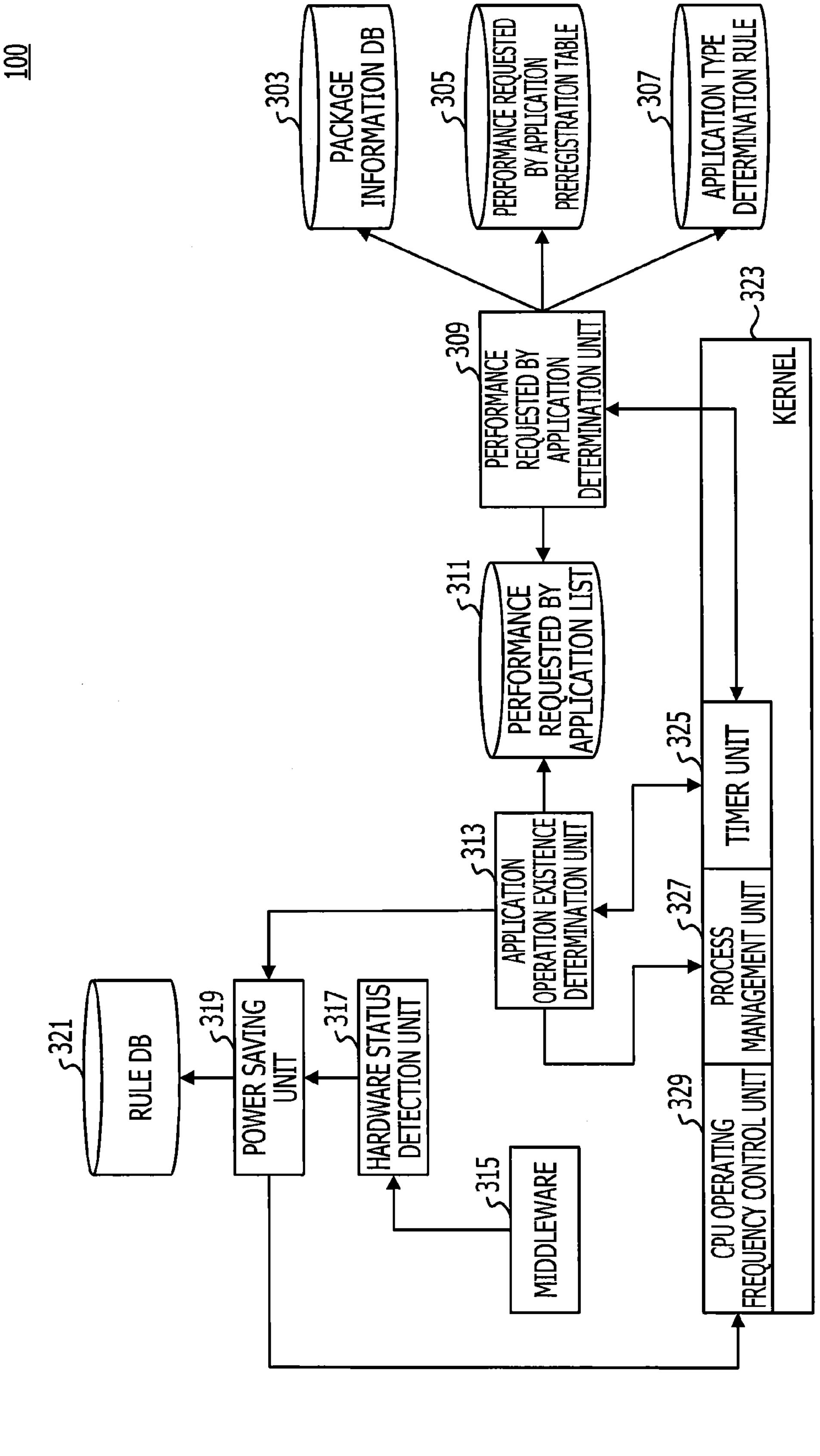
FIG. 3 is a first functional block diagram of an information processing apparatus.

A functional block diagram of the information processing apparatus 100 in FIG. 1 is illustrated in FIG. 3. In the present embodiment, the following processes will be described: consulting the package information DB 303 of installed applications at certain time intervals, reconstructing the performance requested by application list 311, and determining whether an application for which response performance is important is actually used, in accordance with monitoring result a of CPU time which the application uses.

The information processing apparatus 100 includes the package information DB 303, a performance requested by application preregistration table 305, an application type determination rule 307, an performance requested by application determination unit 309, an performance requested by application list 311, an application operation existence determination unit 313, a kernel 323, middleware 315, a hardware status detection unit 317, a power saving unit 319, and a rule DB 321. The kernel 323 includes a timer unit 325, a process management unit 327, and a CPU operating frequency control unit 329. Components that have already been described will be denoted by the same reference numerals and description thereof will be omitted.

The performance requested by application preregistration table 305 is a table in which performance requested by a certain application is defined previously. The application type determination rule 307 is a rule for the correlation between logical formulae for determining type of application, and type of application. The performance requested by application determination unit 309 analyzes combinations of access control information, and determines the type of the application with reference to the package information DB 303, the performance requested by application preregistration table 305, and the determination rule 307. The performance requested by application determination unit 309 generates the performance requested by application list 311. The performance requested by application determination unit 309 carries out these operations in response to notification issued by the timer unit 325. The performance requested by application list 311 is a list which is created by merging a determination result table 440 and a performance requested by application preregistration table 450 which will be described later. The application operation existence determination unit 313 is reads and analyzes a process of the application at fixed intervals in response to notification issued by the timer unit 325. The application operation existence determination unit 313 detects, with reference to the performance requested by application list 311, that the application of which name exists in a to-be-monitored application list has consumed the CPU time over a reference value, and issues to-be-monitored application activation event notification to the power saving unit 319. The middleware 315 is software which functions as a foundation of applications. An example of the middleware 315 is Android framework (registered trademark). The middleware 315 notifies the hardware status detection unit 317 that, for example, there has been a change in on and off of the LCD 213. The hardware status detection unit 317 detects change in the state of the LCD 213, and notifies the detected fact to the power saving unit 319. The power saving unit 319 transmits, to the CPU operating frequency control unit 329, an instruction to change the operating frequency of the CPU 201. The kernel 323 provides functions to, for example, monitor applications and peripheral devices, manage resources, such as memory, and carry out interrupt processes. The timer unit 325 acquires time information. The process management unit 327 manages processes of applications. The CPU operating frequency control unit 329 controls the operating frequency of the CPU 201.

The application type determination rule 307 is illustrated in FIG. 4. In the field of smartphones, anyone may register a developed application in the market. For this reason, access control information for controlling access to the data in the terminal and peripheral devices is included in the application. The user refers to the access control information at the time of installation of the application, checks whether the application accesses to undesired data and peripheral devices, and determines whether to install the application. During the execution of the application, a security function of the OS blocks the access to data and peripheral devices if there is an access to the data and peripheral devices which are not described in the access control information. The access control information includes reducing, for example, not only access to personal information, but recording, photographing, and regularly shifting the terminal to a sleep state even when the LCD is off. In the present embodiment, it is noted that type of application may be determined by the application of plural kinds of access control information included in a single application to a logical formula.

The application type determination rule 307 includes formula 412 and action 414. Formula 412 represents a logical formula for determining type of application. Action 414 represents type of application determined by formula 412. For example, if the access control information included in an application satisfies the logical formula "reduction of terminal from shifting to the sleep state, and recording and (change in audio setting or change in the entire terminal setup) and full Internet access," the type of application is determined to be "VoIP." Type of application herein represents information about file transfer systems or devices employed by the application.

A requested performance determination rule 420 is illustrated in FIG. 5. The requested performance determination rule 420 includes formula 412 and action 414. Formula 412 represents type of application. Action 414 represents an action corresponding to the type of application shown in formula 412. The requested performance determination rule 420 represents that a real-time response is desired even if the LCD 213 is off when the type of application is "VoIP, streaming, or IC recorder." The performance requested by application herein represents that a real-time response is requested to the application, even when the LCD 213 is off.

A package DB 430 is illustrated in FIG. 6. The package DB 430 includes application names 432, access control information 434, creator information 436 and file information 438. The application names 432 represent names of applications. Access control information 434 is information for controlling access to data and peripheral device in terminal by application. The access control information 434 includes "reduce shifting of the terminal to the sleep state," "recording," "changing in audio setting," and "fully access to the Internet." The creator information represents information about the creator of the application. The file information 438 represents information used for update and deletion of an application package.

Application A, for example, is permitted to "reduce shifting of the terminal to the sleep state," "record," "change in audio setting," and "fully access to the Internet." Application G, for example, is permitted to "reduce shifting of the terminal to the sleep state" and "fully access to the Internet." In accordance with the access control information 434, it is recognized that application A and application B are VoIP, application C is streaming, application D is an IC recorder, application E is a browser, application F is audio retrieval, and application G is application related to a navigation system.

The determination result table 440 is illustrated in FIG. 7. The determination result table 440 as an association information includes application names 432 and requested performance 444. The performance requested by application determination unit 309 generates the determination result table 440 in accordance with the application type determination rule 307, the requested performance determination rule 420, and the package information DB 303. The determination result table 440 represents whether a real-time response is desired when the LCD 213 is off regarding a certain application.

FIG. 8 illustrates the performance requested by application preregistration table 305. The performance requested by application preregistration table 305 includes application names 432 and requested performance 444. The performance requested by application preregistration table 305 is generated previously by an administrator. The performance requested by application preregistration table 305 represents that, for example, an OS standard service X requests a real-time response when the LCD 213 is off.

The performance requested by application list 311 is illustrated in FIG. 9. The performance requested by application list 311 includes application names 432 and requested performance 444. The performance requested by application determination unit 309 generates the performance requested by application list 311 by merging the determination result table 440 and the performance requested by application preregistration table 305.

Figure 10:
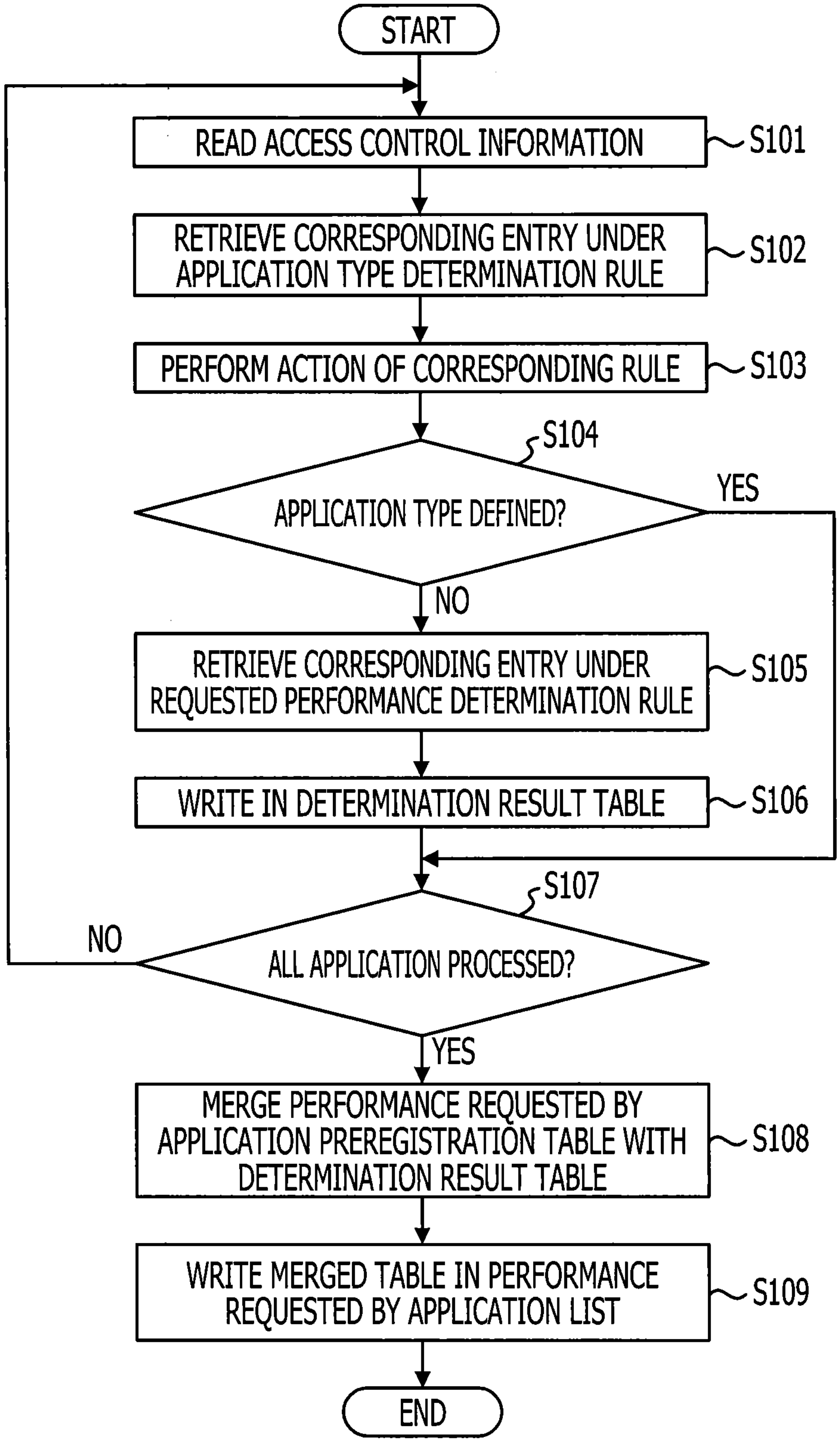
FIG. 10 is a first flowchart related to a generation process of a performance requested by application list.

A flowchart related to a generation process of the performance requested by application list 311 is illustrated in FIG. 10.

In S101, the performance requested by application determination unit 309 reads access control information from the package information DB 303. The process of the performance requested by application determination unit 309 proceeds to S102.

In S102, the performance requested by application determination unit 309 retrieves a corresponding entry with reference to the application type determination rule 307 in accordance with the read access control information. The process of the performance requested by application determination unit 309 proceeds to S103.

In S103, the performance requested by application determination unit 309 determines type of application with reference to the action of the corresponding rule. The process of the performance requested by application determination unit 309 proceeds to S104.

In S104, the performance requested by application determination unit 309 determines whether type of application has been determined. If the type of application has been determined, the process of the performance requested by application determination unit 309 proceeds to 5107. If the type of application has not been determined, the process of the performance requested by application determination unit 309 proceeds to S105.

In S105, the performance requested by application determination unit 309 retrieves an action corresponding to the type of application with reference to the requested performance determination rule 420. The process of the performance requested by application determination unit 309 proceeds to S106.

In S106, the performance requested by application determination unit 309 correlates the application names and requested performance and writes the correlated application names and requested performance in the determination result table 440. The process of the performance requested by application determination unit 309 proceeds to S107.

In S107, the performance requested by application determination unit 309 determines whether all the applications have been processed. If all the applications have been processed, the process of the performance requested by application determination unit 309 proceeds to S108. If all the applications have not been processed, the process of the performance requested by application determination unit 309 returns to S101.

In S108, the performance requested by application determination unit 309 merges the application request performance preregistration table 305 with the determination result table 440. The process of the performance requested by application determination unit 309 proceeds to S109.

In S109, the performance requested by application determination unit 309 generates the performance requested by application list 311 in accordance with the merging process in S108. The performance requested by application determination unit 309 terminates the process.

Figure 11:
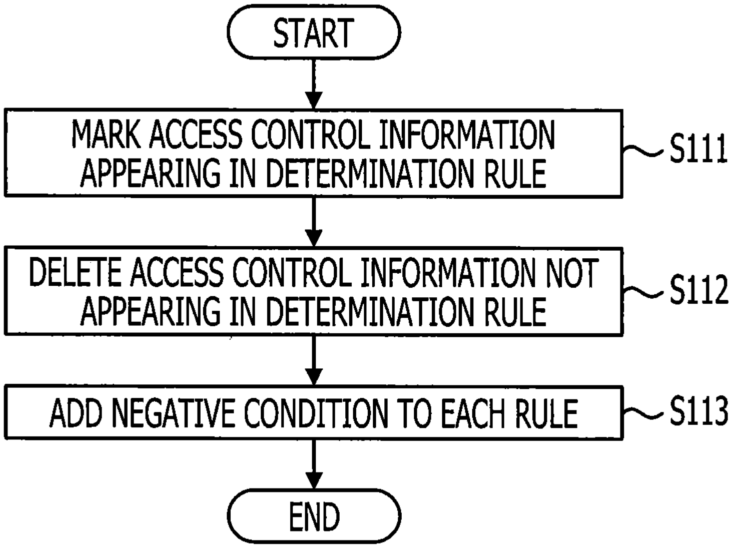
FIG. 11 is a flowchart which illustrates details of a process to retrieve an entry corresponding to the application type determination rule.

FIG. 11 is a flowchart related to details of the process of retrieving the corresponding entry under the application type determination rule in S102 which has been described with reference to FIG. 10.

In S111, the performance requested by application determination unit 309 places a mark on pieces of the access control information appearing in the application type determination rule 307 as illustrated in FIG. 12 with reference to the application type determination rule 307. The process of the performance requested by application determination unit 309 proceeds to S112.

In S112, the performance requested by application determination unit 309 deletes pieces of the access control information that have not appeared in the application type determination rule 307 as illustrated in FIG. 12. The process of the performance requested by application determination unit 309 proceeds to S113.

In S113, the performance requested by application determination unit 309 adds a negative condition to each rule such that only applications having no access control information that has not appeared in the rule are applied to the rule. The application type determination rule 307 to which the negative condition has been added is illustrated in FIG. 13. The performance requested by application determination unit 309 terminates the process.

Figure 14:
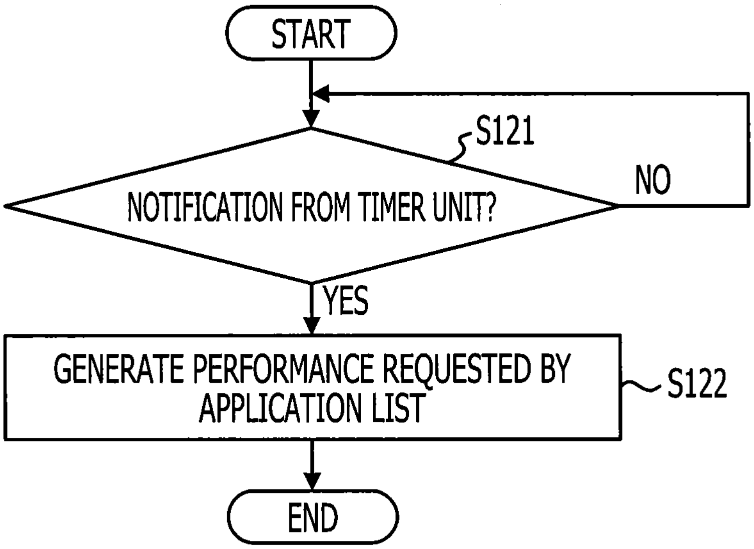
FIG. 14 is a second flowchart related to a generation process of a performance requested by application list.

A flowchart related to a generation process of the performance requested by application list 311 is illustrated in FIG. 14.

In S121, the performance requested by application determination unit 309 determines whether the timer unit 325 has issued notification that a predetermined time period has elapsed. If the timer unit 325 has issued notification that a predetermined time period has elapsed, the process of the performance requested by application determination unit 309 proceeds to S122. If the timer unit 325 has not issued notification that a predetermined time period has elapsed, the process of the performance requested by application determination unit 309 returns to S121.

In S122, the performance requested by application determination unit 309 carries out a generation process of the performance requested by application list 311. The performance requested by application determination unit 309 terminates the process.

Figure 15:
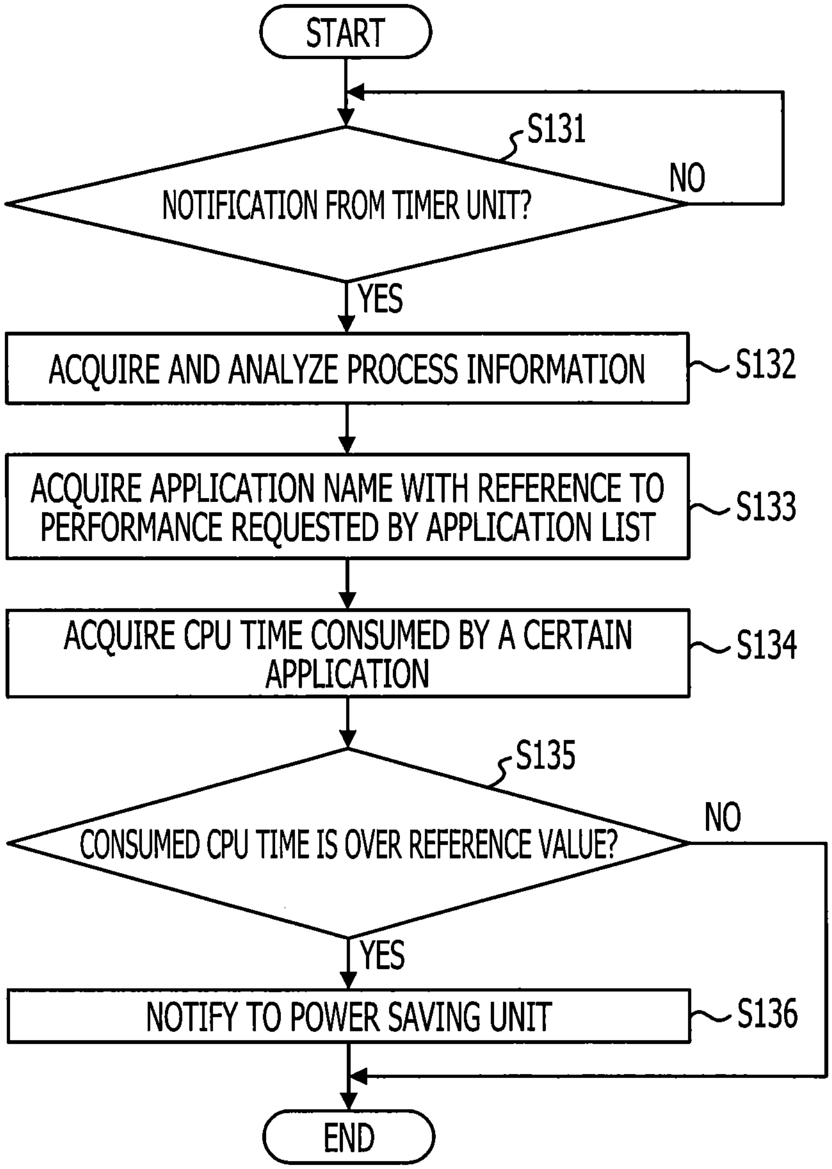
FIG. 15 is a first flowchart related to an operation of an application operation existence determination unit.

A flowchart related to the operation of the application operation existence determination unit 313 is illustrated in FIG. 15.

In S131, the application operation existence determination unit 313 determines whether the timer unit 325 has issued notification that a predetermined time period has elapsed. If the timer unit 325 has issued notification that a predetermined time period has elapsed, the process of the application operation existence determination unit 313 proceeds to S132. If the timer unit 325 has not issued notification that a predetermined time period has elapsed, the process of the application operation existence determination unit 313 returns to S131.

In S132, the application operation existence determination unit 313 acquires process information of the application from the process management unit 327 and analyzes the acquired process information. The process of the application operation existence determination unit 313 proceeds to S133.

In S133, the application operation existence determination unit 313 acquires application names with reference to the performance requested by application list 311. The process of the application operation existence determination unit 313 proceeds to S134.

In S134, the application operation existence determination unit 313 acquires CPU time which the application corresponding to the application name acquired in S133 has consumed. The process of the application operation existence determination unit 313 proceeds to S135.

In S135, the application operation existence determination unit 313 determines whether there is any application which has consumed the CPU time over a reference value. If there is an application which has consumed the CPU time over a reference value, the process of the application operation existence determination unit 313 proceeds to S136. If there is no application which has consumed the CPU time over a reference value, the application operation existence determination unit 313 terminates the process.

In S136, the application operation existence determination unit 313 notifies the power saving unit 319 that there is an application which has consumed the CPU time over a reference value. The power saving unit 319 notifies the CPU operating frequency control unit 329 of an instruction to control change in the operating frequency of the CPU and makes the CPU operating frequency control unit 329 control the operating frequency of the CPU. The application operation existence determination unit 313 terminates the process.

Figure 16:
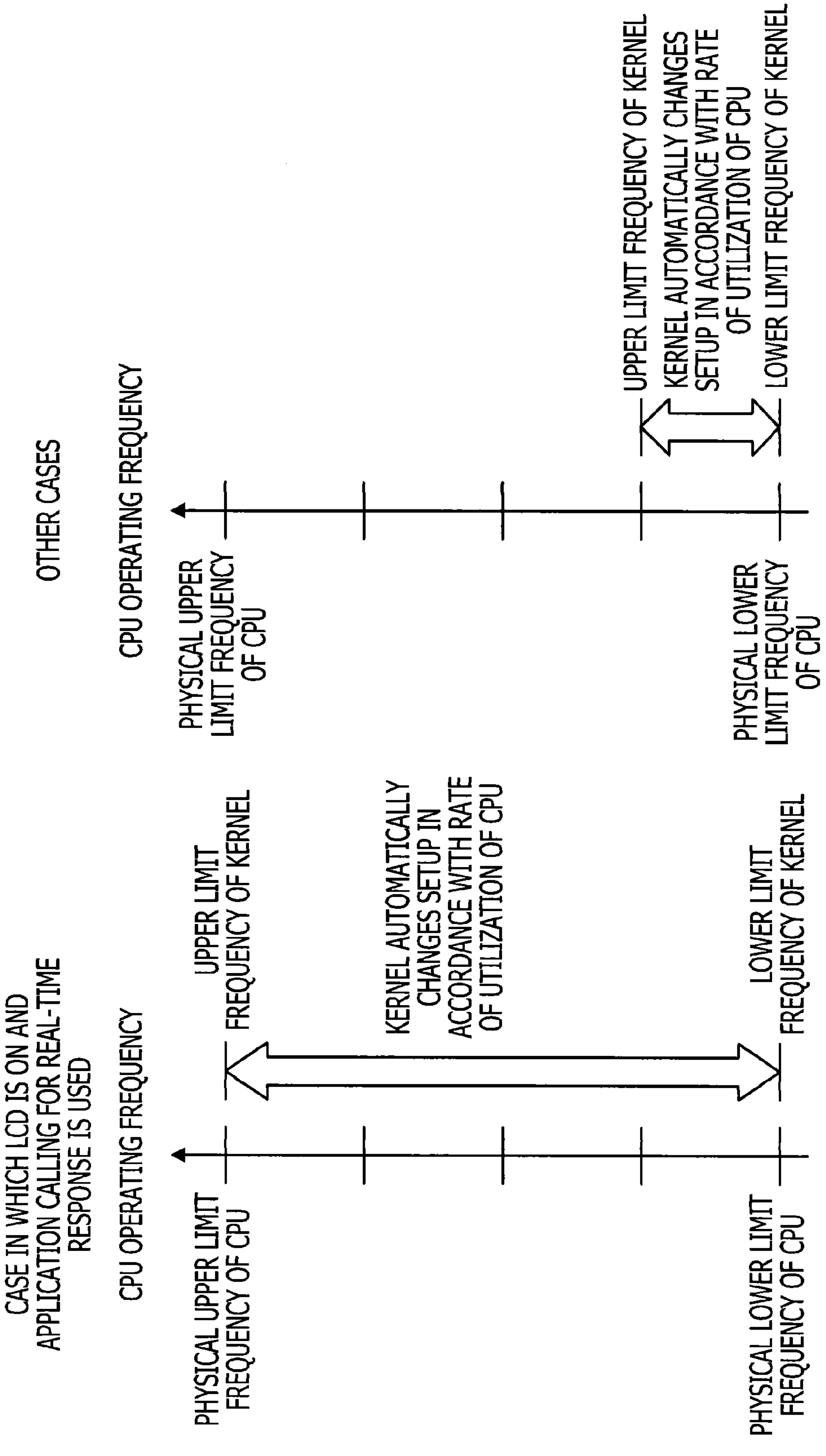
FIG. 16 is a first diagram which illustrates a control concept of a CPU operating frequency in a smartphone.

A control concept of the operating frequency of the CPU in a smartphone is illustrated in FIG. 16. In the present embodiment, it is determined whether a real-time response is desired for the application used when the LCD 213 is off. When the LCD 213 is on and when an application using, for example, the VoIP is operating although the LCD 213 is off, it is determined that the user is manipulating the terminal and therefore the operating frequency of the CPU is set high, or parameters are adjusted such that the kernel of the OS may set the operating frequency of the CPU high.

The requested performance determination rule 420 in a case in which content of the performance requested by the application is different from those described above and is complicated is illustrated in FIG. 17. The requested performance is divided into plural stages in accordance with tolerance against delay in the process of the applications, such as the VoIP. In subsequent processes, the performance requested by application list 311 illustrated in FIG. 19 is generated with reference to the determination result table 440 illustrated in FIG. 18 in the same manner as the processes described above.

Figure 20:
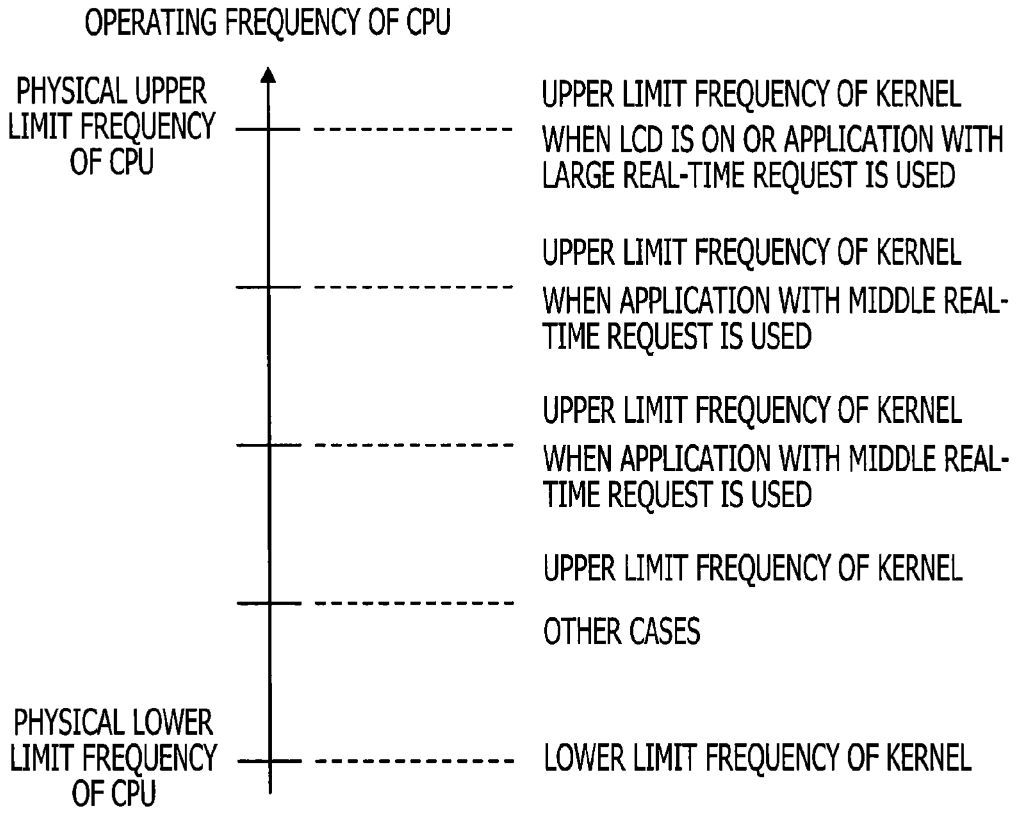
FIG. 20 is a second diagram which illustrates a control concept of a CPU operating frequency in a smartphone.

A control concept of the operating frequency of the CPU in a smartphone is illustrated in FIG. 20. In the present embodiment, if an application, such as the VoIP, is operating in a state in which the LCD 213 is off, an upper limit of the operating frequency of the CPU 201 set to the kernel 323 of the OS is made to vary.

Second Embodiment

Figure 21:
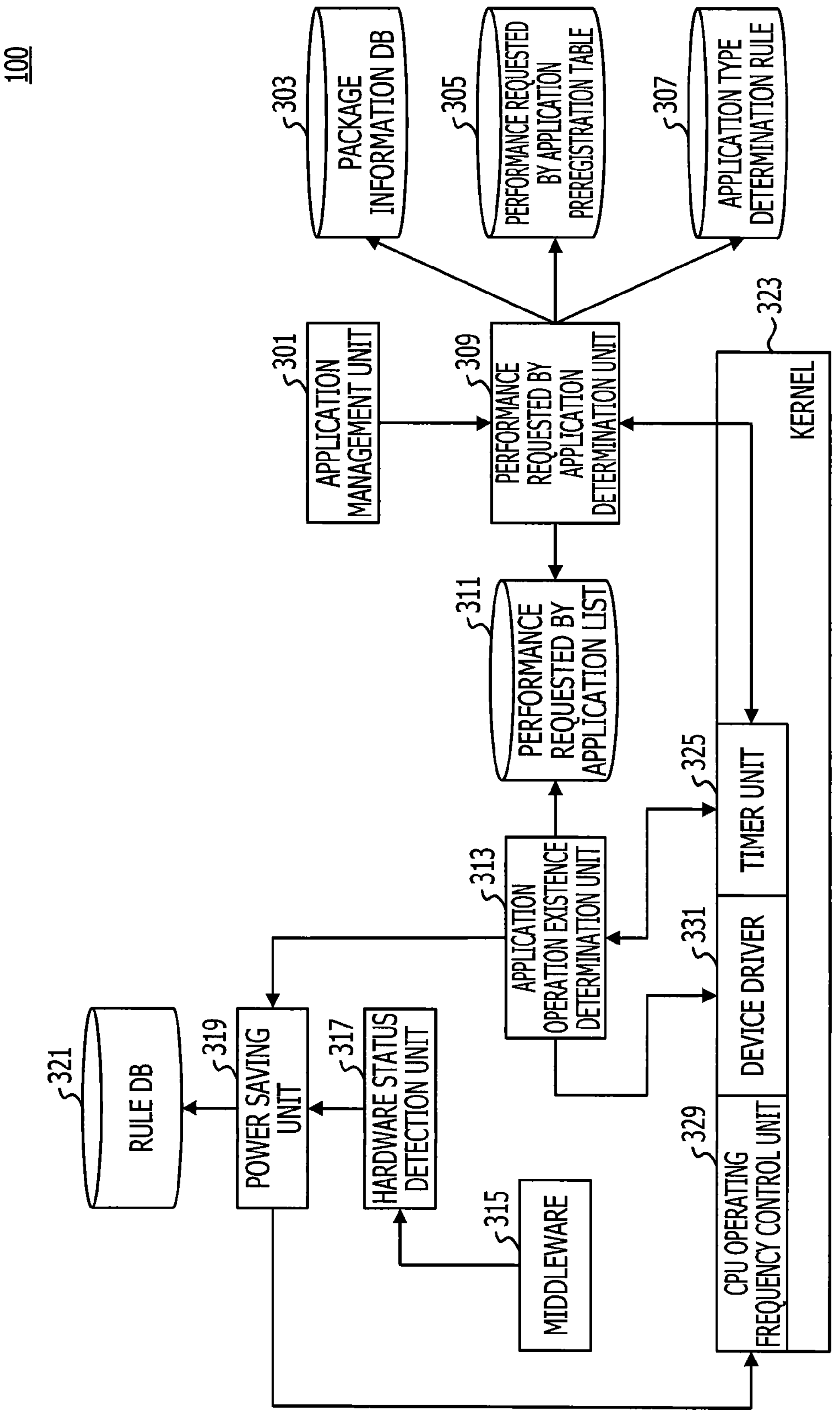
FIG. 21 is a second functional block diagram of an information processing apparatus.

A functional block diagram of the information processing apparatus 100 in FIG. 1 is illustrated in FIG. 21. In the present embodiment, a configuration in which an operation of an application is determined by the detection of device access and in which the performance requested by application list 311 is generated by an event of termination of an operation of an installer is described.

The information processing apparatus 100 includes a package information DB 303, a performance requested by application preregistration table 305, an application type determination rule 307, an application management unit 301, an performance requested by application determination unit 309, the performance requested by application list 311, an application operation existence determination unit 313, a kernel 323, middleware 315, a hardware status detection unit 317, a power saving unit 319, and a rule DB 321. The kernel 323 includes a timer unit 325, a device driver 331, and a CPU operating frequency control unit 329. Components that have been described above will be denoted by the same reference numerals and description thereof will be omitted.

The application management unit 301 issues application maintenance event notification to the performance requested by application determination unit 309. The application management unit 301 notifies the performance requested by application determination unit 309 of completion of installation and uninstallation of the application. The device driver 331 detects access to the device, and notifies the application operation existence determination unit 313 of device access event notification. The application operation existence determination unit 313 notifies the power saving unit 319 of to-be-monitored application activation event notification. The application operation existence determination unit 313 notifies the power saving unit 319 that an application of which name exists in the to-be-monitored application list has accessed a particular device.

Figure 22:
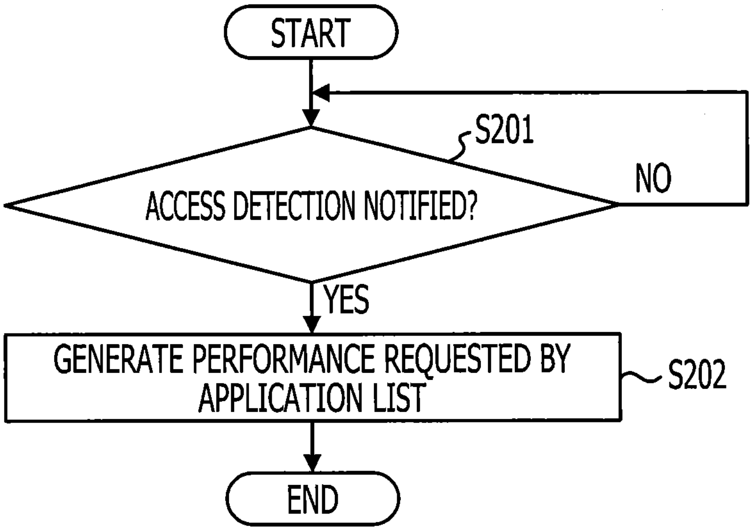
FIG. 22 is a third flowchart related to a generation process of a performance requested by application list.

A flowchart related to a generation process of the performance requested by application list 311 is illustrated in FIG. 22.

In S201, the performance requested by application determination unit 309 determines whether there has been any notification from the device driver 331 that device access has been detected. If there has been any notification from the device driver 331 that device access has been detected, the process of the performance requested by application determination unit 309 proceeds to S202. If there has not been any notification from the device driver 331 that device access has been detected, the process of the performance requested by application determination unit 309 returns to S201.

In S202, the performance requested by application determination unit 309 carries out a generation process of the performance requested by application list 311. The performance requested by application determination unit 309 terminates the process.

Figure 23:
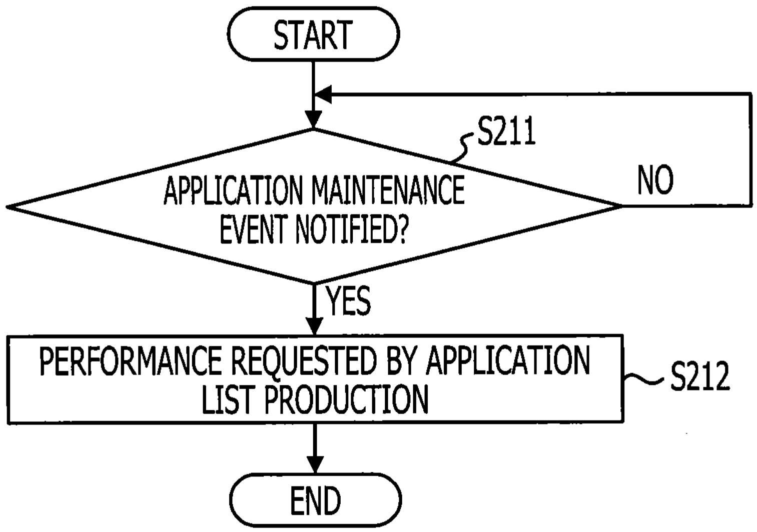
FIG. 23 is a fourth flowchart related to a generation process of a performance requested by application list.

A flowchart related to a generation process of the performance requested by application list 311 is illustrated in FIG. 23.

In S211, the performance requested by application determination unit 309 determines whether there has been any application maintenance event notification from the application management unit 301. If there has been any application maintenance event notification from the application management unit 301, the process of the performance requested by application determination unit 309 proceeds to S212. If there has not been any application maintenance event notification from the application management unit 301, the process of the performance requested by application determination unit 309 returns to S211.

In S212, the performance requested by application determination unit 309 carries out a generation process of the performance requested by application list 311. The performance requested by application determination unit 309 terminates the process.

Figure 24:
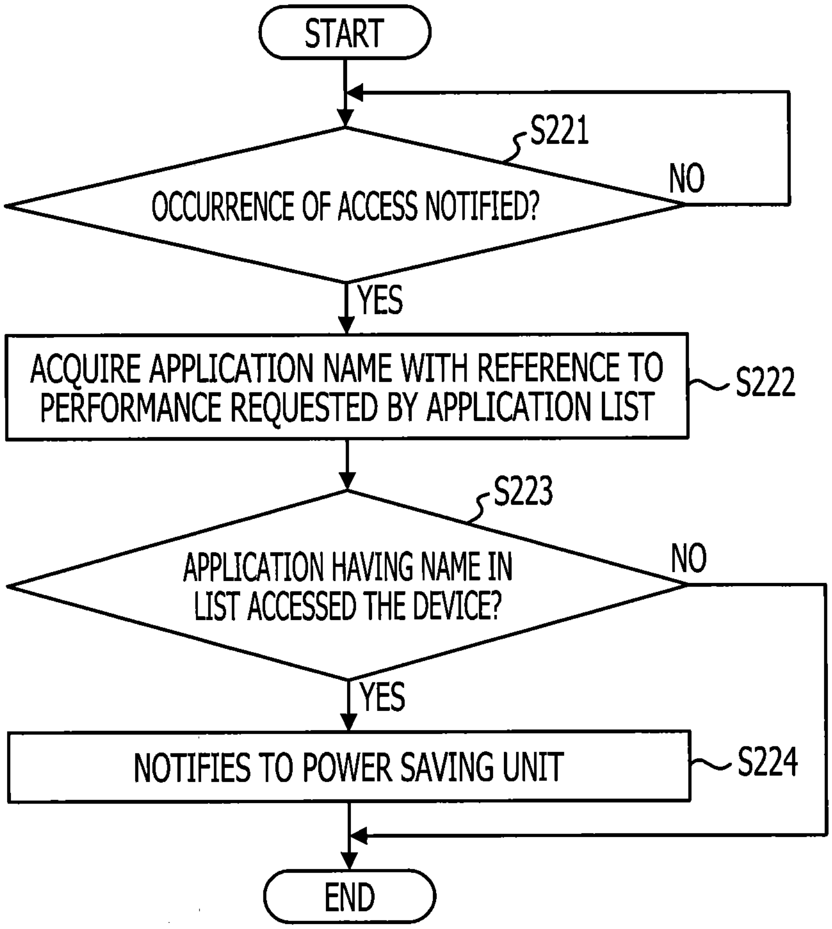
FIG. 24 is a second flowchart related to an operation of an application operation existence determination unit.

A flowchart related to an operation of the application operation existence determination unit 313 in the present embodiment is illustrated in FIG. 24.

In S221, the application operation existence determination unit 313 determines whether there has been any notification from the device driver 331 that device access has been detected. If there has been any notification from the device driver 331 that device access has been detected, the process of the performance requested by application determination unit 309 proceeds to S222. If there has not been any notification from the device driver 331 that device access has been detected, the process of the performance requested by application determination unit 309 returns to S221.

In S222, the application operation existence determination unit 313 acquires application names with reference to the performance requested by application list 311. The process of the application operation existence determination unit 313 proceeds to S223.

In S223, the application operation existence determination unit 313 determines whether an application corresponding to the application name acquired in S222 has accessed a particular device. If an application corresponding to the application name acquired in S222 has accessed a particular device, the process of the application operation existence determination unit 313 proceeds to S224. If no application corresponding to the application name acquired in S222 has accessed a particular device, the application operation existence determination unit 313 terminates the process.

In S224, the application operation existence determination unit 313 notifies the power saving unit 319 that the application corresponding to the application name acquired in S222 has accessed a particular device. The power saving unit 319 notifies the CPU operating frequency control unit 329 of an instruction to control change in the operating frequency of the CPU and makes the CPU operating frequency control unit 329 control the operating frequency of the CPU. The application operation existence determination unit 313 terminates the process.

Third Embodiment

Figure 25:
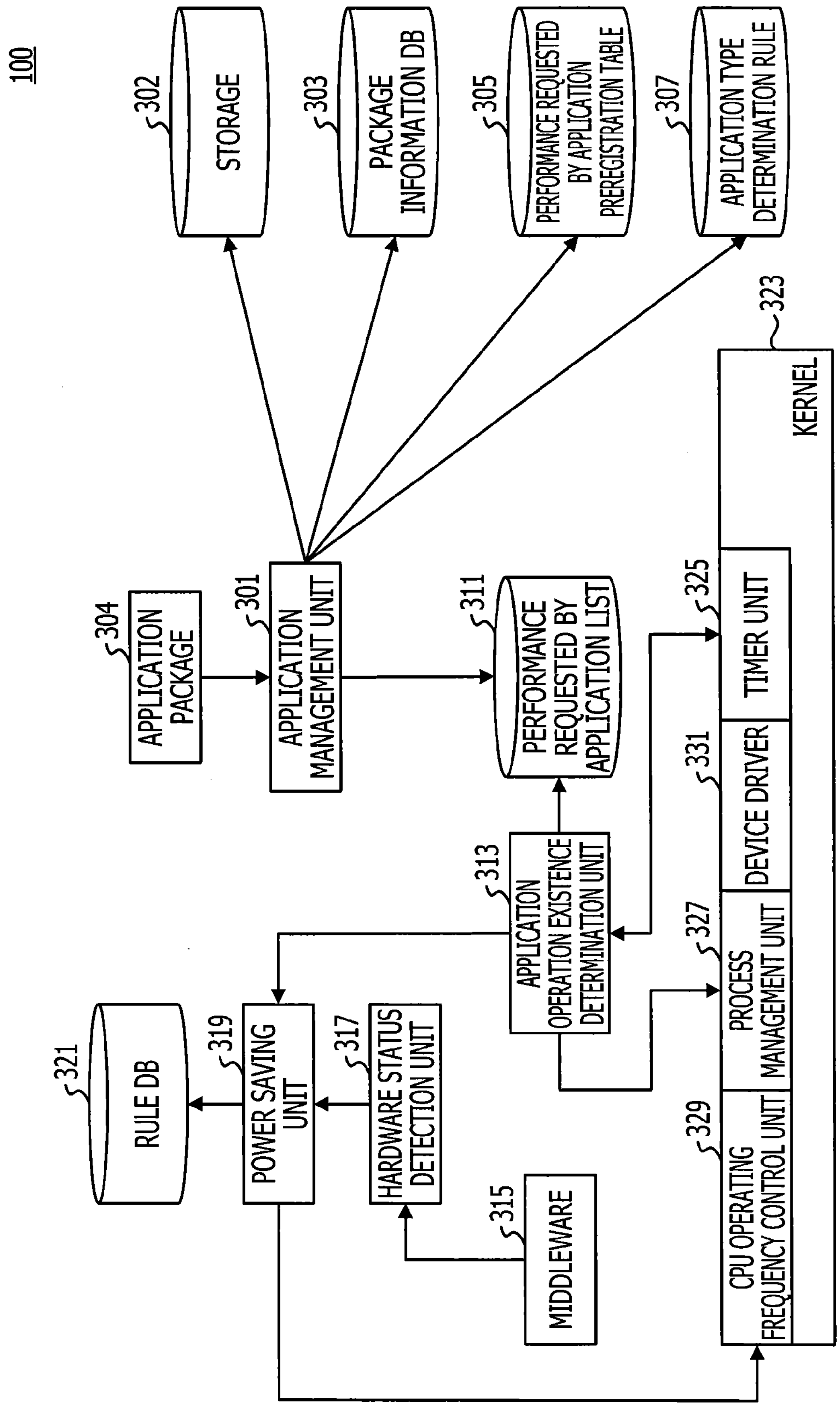
FIG. 25 is a third functional block diagram of an information processing apparatus.

A functional block diagram of the information processing apparatus 100 in FIG. 1 is illustrated in FIG. 25. In the present embodiment, a configuration in which whether an application is operating is determined using both assigned CPU time taken by a process of an application and existence of device access, and in which a function to generate the performance requested by application list 311 is integrated in an installer of the application is described.

The information processing apparatus 100 includes storage 302, a package information DB 303, an application request performance preregistration table 305, a determination rule 307, an application management unit 301, an application package 304, a performance requested by application list 311, an application operation existence determination unit 313, a kernel 323, middleware 315, a hardware status detection unit 317, a power saving unit 319, and a rule DB 321. The kernel 323 includes a timer unit 325, a device driver 331, a process management unit 327, and a CPU operating frequency control unit 329. Components that have been described above will be denoted by the same reference numerals and description thereof will be omitted.

The application management unit 301 updates the performance requested by application list 311 at the time of installation or uninstallation of the application. The existence determination unit 313 is reads and analyzes a process of the application at fixed intervals in response to notification issued by the timer unit 325. The application operation existence determination unit 313 detects, with reference to the performance requested by application list 311, that the application of which name exists in a to-be-monitored application list has consumed the CPU time over a reference value, and issues to-be-monitored application activation event notification to the power saving unit 319. The application management unit 301 notifies the application operation existence determination unit 313 of device access event notification. The application operation existence determination unit 313 notifies the power saving unit 319 that an application of which name exists in the to-be-monitored application list has accessed a particular device.

Figure 26:
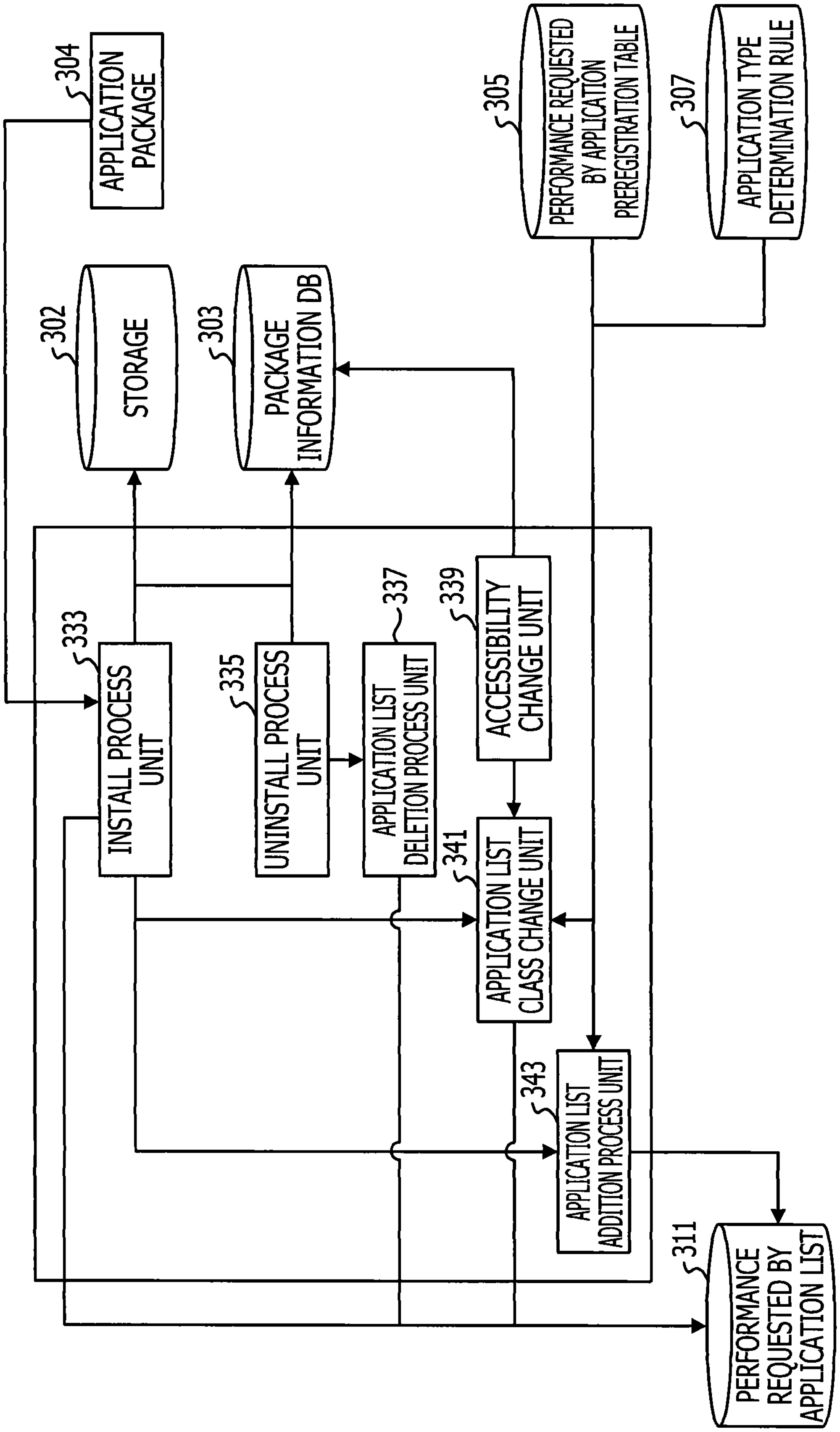
FIG. 26 is a functional block diagram of an application management unit.

A functional block diagram of the application management unit 301 is illustrated in FIG. 26. The application management unit 301 includes an install process unit 333, an uninstall process unit 335, an application list deletion process unit 337, an accessibility change unit 339, an application list class change unit 341, and an application list addition process unit 343. The install process unit 333 carries out an install process. The uninstall process unit 335 carries out an uninstallation process. The accessibility change unit 339 changes accessibility. The application list class change unit 341 changes the class of an application in the performance requested by application list 311. The application list addition process unit 343 adds a new application name to the performance requested by application list 311.

Figure 27:
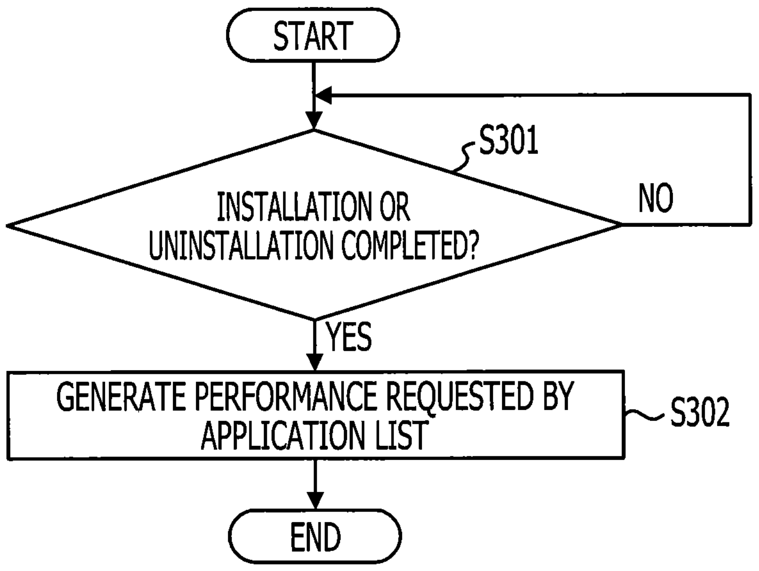
FIG. 27 illustrates a fifth flowchart related to a generation process of a performance requested by application list.

A flowchart related to a generation process of the performance requested by application list 311 is illustrated in FIG. 27.

In S301, the application management unit 301 determines whether either the install process or the uninstallation process of the application has been completed. If either the install process or the uninstallation process of the application has been completed, the process of the application management unit 301 proceeds to S302. If any one of the install process or the uninstallation process of the application has not been completed, the process of the application management unit 301 returns to S301.

In S302, the application management unit 301 carries out a generation process of the performance requested by application list 311. The performance requested by application determination unit 309 terminates the process.

Figure 28:
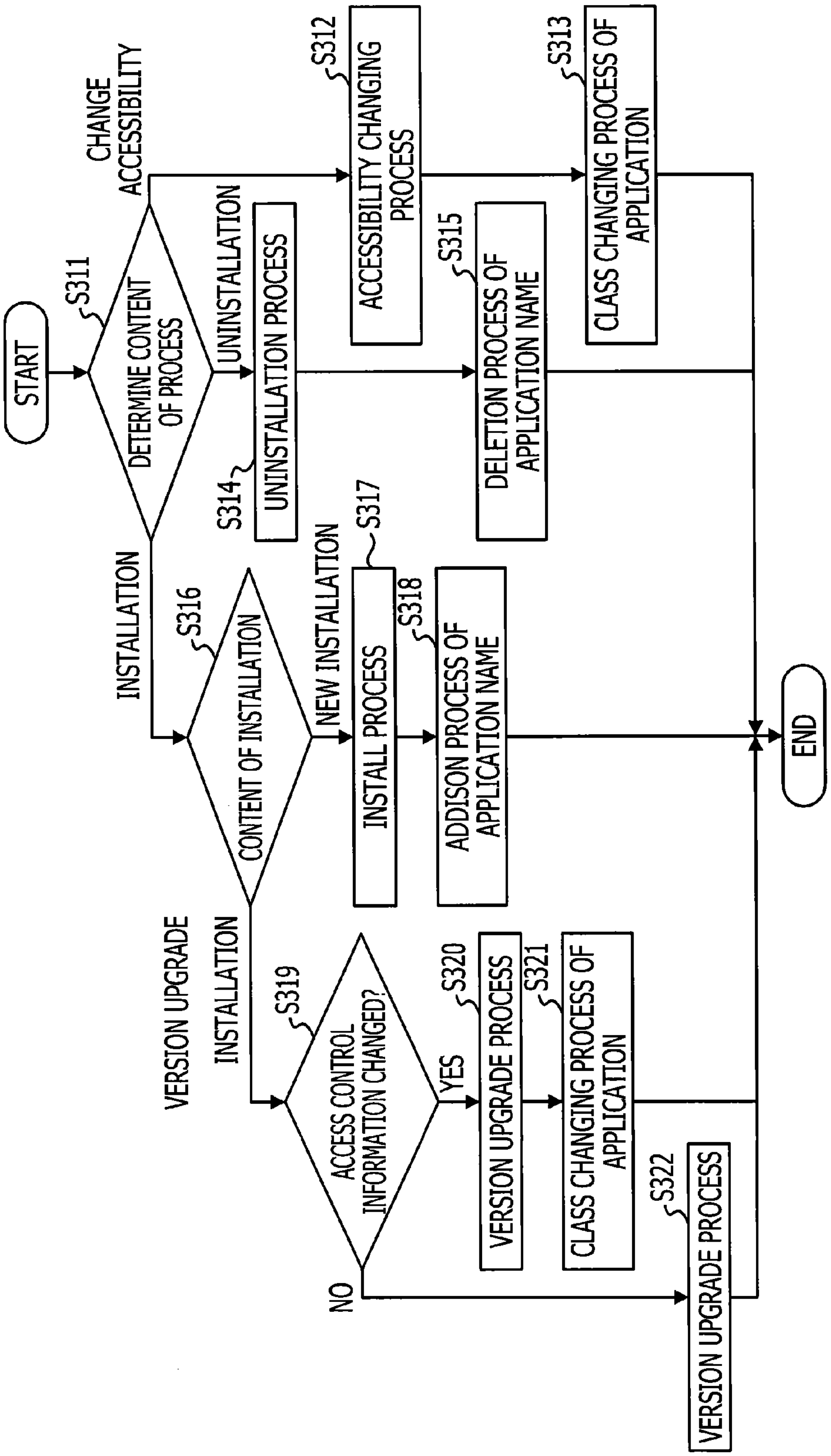
FIG. 28 is a flowchart related to a process of an application management unit.

A flowchart related to a process of the application management unit 301 is illustrated in FIG. 28.

In S311, the accessibility change unit 339 determines content of the process. If the content of the process is change in accessibility, the process of the accessibility change unit 339 proceeds to S312. If the content of the process is uninstallation, the process of the accessibility change unit 339 proceeds to S314. If the content of the process is installation, the process of the application management unit 301 proceeds to S316.

In S312, the accessibility change unit 339 carries out an accessibility changing process. The process of the application list class change unit 341 proceeds to S313.

In S313, the application list class change unit 341 changes the class of the application to performance requested by application list 311. The application list class change unit 341 terminates the process.

In S314, the uninstall process unit 335 carries out an uninstallation process. The process of the uninstall process unit 335 proceeds to S315.

In S315, a deletion process of application names is carried out for the application list deletion process unit 337 and the performance requested by application list 311. The application list deletion process unit 337 terminates the process.

In S316, the install process unit 333 determines the content of installation. If the content of installation is new installation, the process of the install process unit 333 proceeds to S317. If the content of installation is version upgrade installation, the process of the install process unit 333 proceeds to S319.

In S317, the install process unit 333 carries out an install process. The process of the application management unit 301 proceeds to S318.

In S318, the application list addition process unit 343 carries out an additional process of an application name to the performance requested by application list 311. The application list addition process unit 343 terminates the process.

In S319, the install process unit 333 determines whether there is any change in the access control information. If there is change in the access control information, the process of the install process unit 333 proceeds to S320. If there is no change in the access control information, the install process unit 333 proceeds to S322.

In S320, the install process unit 333 performs a version upgrade process. The process of the install process unit 333 proceeds to S321.

In S321, the application list class change unit 341 changes the class of an application in the performance requested by application list 311. The application list class change unit 341 terminates the process.

In S322, the install process unit 333 carries out an upgrade process. The application management unit 301 terminates the process.

Figure 29:
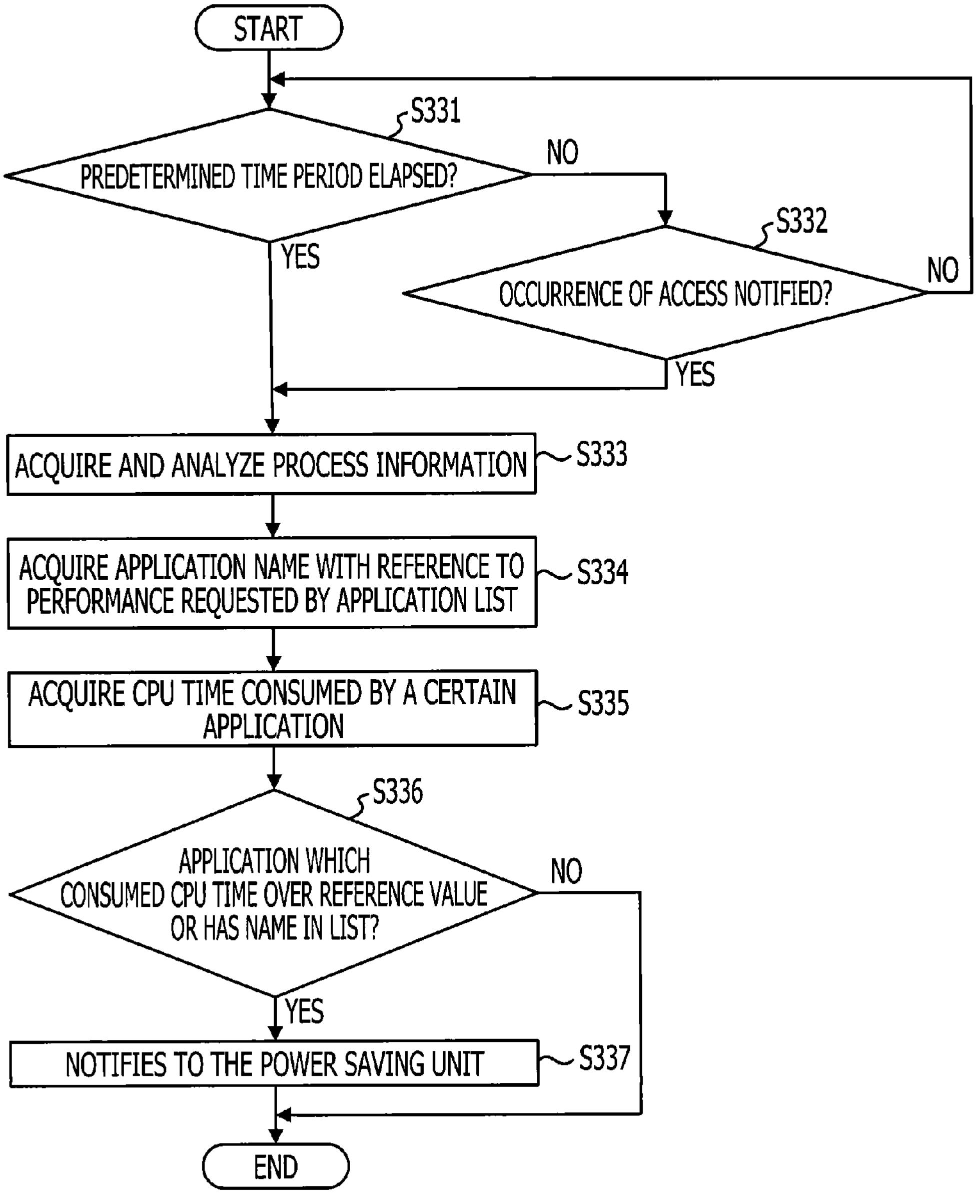
FIG. 29 is a third flowchart related to an operation of an application operation existence determination unit.

A flowchart related to the operation of the application operation existence determination unit 313 is illustrated in FIG. 29.

In S331, the application operation existence determination unit 313 determines whether the timer unit 325 has issued notification that a predetermined time period has elapsed. If the timer unit 325 has issued notification that a predetermined time period has elapsed, the process of the application operation existence determination unit 313 proceeds to S333. If the timer unit 325 has not issued notification that a predetermined time period has elapsed, the process of the application operation existence determination unit 313 proceeds to S332.

In S332, the application operation existence determination unit 313 determines whether there has been any notification from the device driver 331 that device access has been detected. If there has been any notification from the device driver 331 that device access has been detected, the process of the performance requested by application determination unit 309 proceeds to S333. If there has not been any notification from the device driver 331 that device access has been detected, the process of the performance requested by application determination unit 309 returns to S331.

In S333, the application operation existence determination unit 313 acquires process information of the application from the process management unit 327 and analyzes the acquired process information. The process of the application operation existence determination unit 313 proceeds to S334.

In S334, the application operation existence determination unit 313 acquires application names with reference to the performance requested by application list 311. The process of the application operation existence determination unit 313 proceeds to S335.

In S335, the application operation existence determination unit 313 acquires CPU time which the application corresponding to the application name acquired in S334 has consumed. The process of the application operation existence determination unit 313 proceeds to S336.

In S336, the application operation existence determination unit 313 determines whether there is any application which has consumed the CPU time over a reference value and determines whether an application corresponding to the application name acquired in S334 has accessed a particular device. If the determination result is affirmative, the process of the application operation existence determination unit 313 proceeds to S337. If the determination result is negative, the application operation existence determination unit 313 terminates the process.

In S337, the application operation existence determination unit 313 makes the power saving unit 319 notify the CPU operating frequency control unit 329 of an instruction to control change in the operating frequency of the CPU and, thereby, makes the CPU operating frequency control unit 329 control the operating frequency of the CPU. The application operation existence determination unit 313 terminates the process.

In the present embodiment, plural embodiments may be implemented by changing methods for integrating the function of generating the performance requested by application list and methods of determining the operation of the application. There are three major types of the method for integrating the function of generating the performance requested by application list: a method for reconstructing the performance requested by application list from the package information DB at certain time intervals; a method for reconstructing the requested performance list with an end of a certain process by the installer as a trigger; and a method for integrating a function to reconstruct the requested performance list in the installer.

There are three major types of the method for determining the operation of the application: a method for determining the operation of the application in accordance with the CPU time, used by the application, which is checked at certain time intervals; a method for detecting access to a peripheral device; and a method for combining checking the CPU time used by the application at certain time intervals and determining the operation of the application and detecting access to a peripheral device.

A further embodiment is implemented by combining the method for reconstructing the performance requested by application list from the package information DB at certain time intervals, and the method for detecting access to a peripheral device. A still further embodiment is implemented by combining the method for reconstructing the performance requested by application list from the package information DB at certain time intervals, and the method for determining the operation of the application in accordance with the CPU time, used by the application, which is checked at certain time intervals and the method for detecting access to a peripheral device.

A further embodiment is implemented by combining the method for reconstructing the requested performance list with an end of a certain process by the installer as a trigger and the method for detecting access to a peripheral device. A still further embodiment is implemented by combining the method for reconstructing the requested performance list with an end of a certain process by the installer as a trigger and the method for determining the operation of the application in accordance with the CPU time, used by the application, which is checked at certain time intervals and the method for detecting access to a peripheral device.

As further embodiments, combination of the method for integrating a function to reconstruct the requested performance list in the installer and the method for determining the operation of the application in accordance with the CPU time, used by the application, which is checked at certain time intervals and the method for detecting access to a peripheral device. A still further embodiment is implemented by combining the method for integrating a function to reconstruct the requested performance list in the installer and the method for detecting access to a peripheral device.

According to the present embodiment, it is possible, by estimating type of application from the content of the access control information of the application attached to the application package of a smartphone, to determine performance requested by application (i.e., whether the application requests a real-time performance) without preparing information about type of application by a user of the terminal or an application creator. In accordance with the determination result, the operating frequency of the CPU is controlled or released when the LCD is off, whereby it is possible to reduce power consumption of the smartphone and to ensure physical feeling performance for the user.

According to the present embodiment, in a situation in which real-time performance is important, such as music reproduction, telephone call on the VoIP, and reproduction of audio content by streaming, when the user is not manipulating the terminal, it is possible to detect that an application for which a response is important is operating even when the LCD is off, and to control or release the operating frequency of the CPU. Therefore, if an application for which a response is important is operating even when the LCD is off, it is possible to reduce occurrence of, for example, jumping by switching the power setting to a process priority mode.

Although an exemplary information processing apparatus of the present embodiment has been described above, the present embodiment is not limited to those particular examples. Various modifications and changes may be made without departing from the scope of the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium storing a control program for an information processing apparatus that includes a processor configured to execute an application program, the control program causing the information processing apparatus to execute a process comprising:

acquiring the application program and control information, the control information being used for controlling an access by the application program to data in the information processing apparatus and a peripheral device;

determining whether the application program requires a real-time response while the application program is being executed and a user is not manipulating the information processing apparatus, based on a comparison between the control information and a condition defining certain control information that requires the real-time response;

generating response performance information that indicates whether the application program requires the real-time response, based on the determining; and controlling operating frequency of the processor when the application program is executed and the response performance information indicates that the application program does require the real-time response.

2. The non-transitory computer-readable storage medium according to claim 1, wherein the response performance information is generated in response to installation of the application program.

3. The non-transitory computer-readable storage medium according to claim 1, the process further comprising:

determining whether the application program is executed in accordance with time for which the processor processes the application program.

4. The non-transitory computer-readable storage medium according to claim 1, the process further comprising:

determining whether the application program is executed in accordance with a state of accessing to the peripheral device and the control information.

5. The non-transitory computer-readable storage medium according to claim 1, the process further comprising:

updating the response performance information associated with the application program when the application program is installed or uninstalled.

6. The non-transitory computer-readable storage medium according to claim 1, wherein the processor executes a plurality of application programs including the application program, the generating of the response performance information generates a plurality of response performance information for the plurality of application programs, respectively, and the controlling of the operating frequency controls the operating frequency in accordance with at least one of the plurality of response performance information corresponding to at least one of the plurality of application programs which is executed.

7. A method for controlling an information processing apparatus that includes a processor configured to execute an application program, the method comprising:

acquiring the application program and control information, the control information being used for controlling an access by the application program to data in the information processing apparatus and a peripheral device;

determining whether the application program requires a real-time response while the application program is being executed and a user is not manipulating the information processing apparatus, based on a comparison between the control information and a condition defining certain control information that requires the real-time response;

generating response performance information that indicates whether the application program requires the real-time response, based on the determining; and controlling operating frequency of the processor when the application program is executed and the response performance information indicates that the application program does require the real-time response.

8. An information processing apparatus that includes a processor configured to execute an application program, the apparatus comprising:

a memory that stores type information associating a combination of control information with a type of the application program and response performance information associated with a type of the application program; and the processor that executes a process including:

acquiring the application program and control information, the control information being used for controlling an access by the application program to data in the information processing apparatus and a peripheral device;

determining whether the application program requires a real-time response while the application program is being executed and a user is not manipulating the information processing apparatus, based on a comparison between the control information and a condition defining certain control information that requires the real-time response;

generating the response performance information that indicates whether the application program requires the real-time response, based on the determining; and controlling operating frequency of the processor when the application program is executed and the response performance information indicates that the application program does require the real-time response.

* * * * *